2,769,798

AMINOPLAST RESINS AND AMINOPLAST RESIN COMPOSITIONS STABILIZED WITH OXIRANE COMPOUNDS AND PROCESS OF PREPARING SAME

Helmut Meis, Walter Scheib, and Karl-Heinz Decker, Letmathe in Westphalia, Germany, assignors to Rutgerswerke-Aktiengesellschaft, Frankfurt am Main, Germany No Drawing. Application June 26, 1953, Serial No. 364,482

Claims priority, application Germany July 7, 1952

6 Claims. (Cl. 260—45.8)

This invention relates to aminoplast resins and aminoplast resin compositions and it has particular relation to the preparation of such resins and resin compositions of increased stability on storage.

It has been known that the flowing capacity of hardenable aminoplast resins and resin compositions changes during storage. This is a considerable disadvantage, because change of the flowing capacity means a change of the molding characteristics so that the working conditions in processing such resins and their compositions must be correspondingly modified. The degree of the change of flowing capacity is dependent on temperature and the changes play a particularly important role when shipping of the resins and their compositions takes a considerable period of time under varying temperature conditions.

It has been known to prepare aminoplast products of particularly high flowing capacity, but changes in flowing capacity could not be eliminated in this manner. It has been also known to use thiourea as a stabilizer for aminoplast products. However, the use of thiourea necessitates extension of the time required for certain steps in processing the aminoplast products. Moreover, the thiourea-containing products formed at molding temperatures are not indifferent to the material of the molds and it is, therefore, necessary to use chromium plated molds in molding these stabilized products or compositions. The above mentioned difficulties cannot be eliminated by other steps, e. g. change of the pH of the compositions to render them more alkaline or the addition of specific accelerators of hardening or curing.

It has now been unexpectedly found that a considerable stabilizing effect on aminoplast products can be obtained, by using as stabilizer in aminoplast products, particularly products prepared by reacting urea, thiourea, imino-urea (guanidine), melamine and the like, or their mixtures, with aldehydes, particularly formaldehyde, a compound corresponding to the general formula

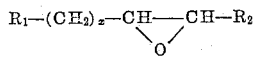

wherein $R_1$ stands for an organic radical, preferably an acyl, carboxyl, alkoxy, cycloalkoxy, aroxy, alkaroxy, aralkoxy radical, or an alkyl, cycloalkyl, aryl, alkylaryl, or aralkyl radical or one of any of these radicals substituted by a hydroxy group or a primary or secondary amino group; $R_2$ stands for one of the before-mentioned radicals particularly hydrocarbon radical or a hydrogen atom, and $x$ stands for 1 or another integer having a value in the range of 2–10.

The stabilizers according to the present invention are essentially derivatives of propenoxide, based on epichlorhydrin (chloropropylene oxide), in which the chlorine atom is substituted, for example, by a phenoxy, benzoyl or cyclohexoxy radical. Analogous derivatives of butene oxide and of higher alkene oxides can also be used.

It has been found that the use of stabilizers according to this invention, in an amount not exceeding 1% by weight, based on the weight of the aminoplast compound, is in general sufficient for obtaining the desired stability. The stabilizers can be applied by adding them prior to condensation to the reactants, e. g. urea and formaldehyde, or during condensation, or after condensation, i. e. to the condensed product. The stabilizers according to the invention can be used also in the presence of fillers, such as celluose, wood flour, zinc oxide, pigments, softening agents, plasticizers and lubricants, e. g. magnesium stearate. It has been found that, when added prior to or during condensation, the stabilizers of the invention have also the effect of causing condensation to proceed with particular uniformity. Their stabilizing effect occurs also upon their addition to the aminoplast product after substantially completed condensation.

Aminoplast products containing a stabilizer according to the present invention, are distinguished by excellent stability on storage. In spite of this stability, the hardening or curing velocity of the products is not reduced. The mechanical properties of articles made from aminoplast products stabilized according to the invention are even better than those of articles made from said products in the absence of the stabilizer, under otherwise equal conditions.

The following examples describe some embodiments of the invention, to which the invention is not limited.

*Example 1*

1000 parts by weight of a finely pulverized urea-formaldehyde molding composition containing 60% by weight of a conventional heat hardenable urea-formaldehyde resin and 40% by weight of cellulose filler, are thoroughly and uniformly mixed with 5 parts by weight of phenoxypropenoxide in a ball mill.

The resulting molding composition shows no substantial change of its flowing capacity on storage, while in the absence of the stabilizer considerable reduction of the flowing capacity occurs under otherwise equal storage conditions already after 100 days or more.

*Example 2*

600 parts by weight of urea, 450 parts by weight of paraformaldehyde, 450 parts by weight of cellulose filler, 3 parts by weight of magnesium stearate, 25 parts by weight of lithopone, and 10 parts by weight of phenoxypropenoxide are intimately mixed and heated to 50° C. until the desired condensation takes place. The product thus obtained is subjected to a consolidating treatment in order to increase its density and is finally ground.

A molding composition of stable flowing capacity is thus obtained, while in the absence of a stabilizer decrease of the flowing capacity occurs on storage after 100 days or more.

*Example 3*

1000 parts by weight of a molding composition containing 60% of heat-hardenable melamine-formaldehyde resin prepared in conventional manner, 40% cellulose filler, pigment and lubricant, are finely ground in a ball mill and uniformly mixed with 8 parts by weight of benzoic acid glycidolester. The flowing capacity of the molding composition thus obtained shows a constant value, while the molding composition used as starting material shows the decreasing flowing capacity of conventional aminoplast products on storage.

It will be understood that this invention is not limited to the steps, materials, working conditions and other details specifically described above and can be carried out with various modifications. For example, the aminoplast condensation products, fillers and other ingredients described in the above examples can be partly or entirely substituted by other aminoplast products or other ingredients of the respective kind, e. g. products containing other resins, such as imino urea, or other fillers, such as wood flour or zinc oxide, or plasticizers and the like. Furthermore the present invention can be applied also to compositions, in which the aminoplast resins are present in mixture or combination with other resins. These and other modifications can be made without departing from the scope of the invention, as defined in the appended claims.

The term "aminoplast" is used in the present specification and claims to denote synthetic resins made from amino compounds, e. g. urea, urea derivatives, melamine, and the like, and mixtures of these compounds, particularly resins obtained by condensation of the amino compounds with aldehydes, particularly formaldehyde. The term "aminoplast products" is used to denote and include the aminoplast resins proper, as well as compositions containing such resins, particularly molding compositions containing such resins in combination with fillers and other ingredients.

It will be understood from the above that for example the following compounds corresponding to the above general formula, can be used in carrying out the present invention:

1.  $C_6H_5O \cdot CH_2 \cdot CH \cdot CH_2$
    $\diagdown O \diagup$

2.  $C_6H_5COO \cdot CH_2 \cdot CH \cdot CH_2$
    $\diagdown O \diagup$

3.  $CH_3CO \cdot CH_2 \cdot CH \cdot CH_2$
    $\diagdown O \diagup$

4.  $CH_3O \cdot CH_2 \cdot CH \cdot CH_2$
    $\diagdown O \diagup$

5.  $CH_2CH_2CH \cdot O \cdot CH_2 \cdot CH \cdot CH_2$
    $\mid_____\mid \quad \diagdown O \diagup$ 6.  $C_2H_5C_6H_4 \cdot O \cdot CH_2 \cdot CH \cdot CH_2$
    $\diagdown O \diagup$ 7.  $C_6H_5 \cdot CH_2O \cdot CH_2 \cdot CH \cdot CH_2$
    $\diagdown O \diagup$ 8.  $CH_3—(CH_2)_n—CH_2—CH\underline{\quad\quad}CH_2$
    $\diagdown O \diagup$ 9.  $CH_2 \cdot CH_2 \cdot (CH_2)_n \cdot CH \cdot CH_2 \cdot CH \cdot CH_2$
    $\mid_____\mid \quad \diagdown O \diagup$ 10. $C_6H_5 \cdot CH_2 \cdot CH \cdot CH_2$
    $\diagdown O \diagup$ 11. $CH_3C_6H_4 \cdot CH_2 \cdot CH \cdot CH_2$
    $\diagdown O \diagup$ 12. $C_6H_5CH_2 \cdot CH_2 \cdot CH \cdot CH_2$
    $\diagdown O \diagup$ 13. $HO—C_6H_4 \cdot CH_2 \cdot CH_2 \cdot CH \cdot CH_2$
    $\diagdown O \diagup$ 14. $H_2N \cdot C_6H_4 \cdot CH_2 \cdot CH_2 \cdot CH \cdot CH_2$
    $\diagdown O \diagup$ 15. $C_6H_5O \cdot CH_2 \cdot CH \cdot CH \cdot CH_3$
    $\diagdown O \diagup$ 16. $C_6H_5O \cdot CH_2 \cdot CH \cdot CH \cdot COCH_3$
    $\diagdown O \diagup$ 17. $CH_3O \cdot CH_2 \cdot CH \cdot CH \cdot O \cdot CH_3$
    $\diagdown O \diagup$ 18. $CH_3CO \cdot CH_2 \cdot CH \cdot CH \cdot COCH_3$
    $\diagdown O \diagup$ 19. $HO \cdot C_6H_4 \cdot CH_2 \cdot CH_2 \cdot CH \cdot CH \cdot CH_2C_6H_4OH$
    $\diagdown O \diagup$ 20. $H_2N \cdot C_6H_4 \cdot CH_2 \cdot CH_2 \cdot CH \cdot CH \cdot CH_2 \cdot C_6H_4 \cdot NH_2$
    $\diagdown O \diagup$ 21. 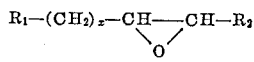

22. $C_6H_5O—(CH_2)_4—CH_2—CH\underline{\quad\quad}CH_2$
    $\diagdown O \diagup$ 23. $HOC_6H_4O—CH_2—CH\underline{\quad\quad}CH_2$
    $\diagdown O \diagup$ 24. $\overset{H}{H_3CN}C_6H_4O—CH_2—CH\underline{\quad\quad}CH_2$
    $\diagdown O \diagup$ The above compounds can be used in carrying out the present invention under conditions and in a manner similar to those described in the above Examples 1–3.

The term "aryl radicals" is used in the present application to include also alkaryl radicals.

What is claimed is:

1. A composition comprising a heat-hardenable amine-formaldehyde resin selected from the group consisting of urea-, thiourea-, imino-urea-, and melamine-formaldehyde resins and a stabilizing compound corresponding to the general formula

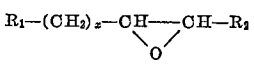

wherein $R_1$ stands for an organic radical selected from a first group consisting of acyl, carboxyl, alkoxy, cycloalkoxy, aroxy, alkaroxy, aralkoxy, alkyl, cycloalkyl, aryl, and aralkyl radicals, a second group consisting of radicals of said first group substituted by a hydroxy radical, a third group consisting of radicals of said first group substituted by a primary amino radical and a fourth group consisting of radicals of said first group substituted by a secondary amine radical; $R_2$ stands for a radical selected from the group consisting of H and a radical of said first, second, third and fourth groups, and $x$ is an integer having a value in the range of 1–10.

2. A composition as claimed in claim 1, in which the amount of the stabilizing compound, based on the amount of the aminoplast resin, does not exceed 1% by weight.

3. A composition as claimed in claim 1, in which the stabilizing compound consists of phenoxypropene oxide.

4. A composition as claimed in claim 1, in which the stabilizing compound consists of benzoic acid glycidol ester.

5. A process for preparing stabilized amine-formaldehyde resins and resin compositions comprising adding to the ingredients for forming the resin and resin compositions, prior to condensation, a compound corresponding to the general formula $$R_1—(CH_2)_x—CH\underline{\quad\quad}CH—R_2$$
$$\diagdown O \diagup$$

wherein $R_1$ stands for an organic radical selected from a first group consisting of acyl, carboxyl, alkoxy, cycloalkoxy, aroxy, alkaroxy, aralkoxy, alkyl, cycloalkyl, aryl, alkaryl and aralkyl radicals, a second group consisting of radicals of said first group substituted by a hydroxy radical, a third group consisting of radicals of said first group substituted by a primary amino radical and a fourth group consisting of radicals of said first group substituted by a secondary amine radical; $R_2$ stands for a radical selected from H and a radical of said first, second, third and fourth groups, and $x$ is an integer having a value in the range of 1–10.

6. A modification of the process claimed in claim 5, in which the stabilizing compound is added during condensation.

References Cited in the file of this patent

UNITED STATES PATENTS

| | | |
|---|---|---|
| 2,125,393 | Nelles et al. | Aug. 2, 1938 |
| 2,637,713 | Suen | May 5, 1953 |